United States Patent
Eckel et al.

(12)

(10) Patent No.: US 6,433,082 B1
(45) Date of Patent: Aug. 13, 2002

(54) HERBICIDAL MIXTURES EXHIBITING A SYNERGISTICS EFFECT

(75) Inventors: Thomas Eckel, Dormagen; Michael Zobel, Düsseldorf; Dieter Wittmann, Leverkusen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/720,334

(22) PCT Filed: Jun. 12, 1999

(86) PCT No.: PCT/EP99/04058

§ 371 (c)(1),
(2), (4) Date: Feb. 8, 2001

(87) PCT Pub. No.: WO00/00030

PCT Pub. Date: Jan. 6, 2000

(30) Foreign Application Priority Data

Jun. 26, 1998 (DE) .......................................... 198 28 539

(51) Int. Cl.[7] .............................................. C08G 63/48
(52) U.S. Cl. ...................................................... 525/67
(58) Field of Search .......................... 252/67; 528/196, 528/198; 264/176.1

(56) References Cited

U.S. PATENT DOCUMENTS

| 5,912,321 | A | 6/1999 | Raith et al. ................. 528/399 |
|---|---|---|---|
| 6,020,081 | A | 2/2000 | Raith et al. ................. 428/704 |
| 6,060,583 | A | 5/2000 | Raith et al. ................. 528/488 |
| 6,093,759 | A | 7/2000 | Gareiss et al. ............... 524/122 |

FOREIGN PATENT DOCUMENTS

| EP | 0 728 811 | 8/1996 |
|---|---|---|
| EP | 0 900 795 | 3/1999 |
| WO | 96/26206 | 8/1996 |
| WO | 97/23135 | 7/1997 |
| WO | 98/28981 | 7/1998 |

OTHER PUBLICATIONS

Database WPI, Week 9435, 1994, Derwent Publications Ltd., London, GB; AN 283222.

XP002117131, "Herbicidal Composition Used in Table Form", & JP 06 211610 A (Nissan Chem. Ind. Ltd.), Aug. 1, 1994 (Aug. 2, 1994).

Primary Examiner—Terressa M. Boykin
(74) Attorney, Agent, or Firm—Joseph C. Gil; Aron Preis

(57) ABSTRACT

The present invention relates to moulding compositions which are treated with phosphazenes and are based on polycarbonate and graft polymers chosen from the group consisting of silicone rubbers, EP(D)M rubbers and acrylate rubbers as the graft base, and which have an excellent flameproofing and very good mechanical properties, such as resistance to stress cracking or notched impact strength.

11 Claims, No Drawings

HERBICIDAL MIXTURES EXHIBITING A SYNERGISTICS EFFECT

The present invention relates to moulding compositions which are treated with phosphazenes and are based on polycarbonate and graft polymers chosen from the group consisting of silicone rubbers, EP(D)M rubbers and acrylate rubbers as the graft base, and which have an excellent flameproofing and very good mechanical properties, such as resistance to stress cracking or notched impact strength.

DE-A 196 16 968 describes polymerizable phosphazene derivatives, processes for their preparation and their use as curable binders for paints, coatings, fillers, stopping compositions, adhesives, mouldings or films.

WO 97/400 92 describes flameproofed moulding compositions of thermoplastic polymers and unsubstituted phosphazenes ($PN_{n-x}H_{1-y}$ type).

EP-A 728 811 describes a thermoplastic mixture comprising aromatic polycarbonate, graft copolymer based on dienes, copolymer and phosphazenes which has good flameproofing properties, impact strength and heat distortion resistance.

The object of the present invention is to provide polycarbonate moulding compositions with an excellent flame resistance and excellent mechanical properties, such as notched impact strength and stability to stress cracking. This spectrum of properties is required in particular for uses in the field of data technology, such as, for example, for housings for monitors, printers, copiers and the like.

It has now been found that moulding compositions which are based on polycarbonate and graft polymers chosen from the group consisting of silicone rubbers, EP(D)M rubbers and acrylate rubbers and comprise phosphazenes have the desired properties.

The invention therefore provides thermoplastic moulding compositions comprising

A) polycarbonate and/or polyester-carbonate,

B) at least one rubber-elastic graft polymer chosen from the group consisting of silicone rubbers, EP(D)M rubbers and acrylate rubbers as the graft base, C) at least one thermoplastic polymer chosen from the group consisting of vinyl (co)polymers and polyalkylene terephthalates and D) at least one phosphazene chosen from the group consisting of phosphazene of the formulae

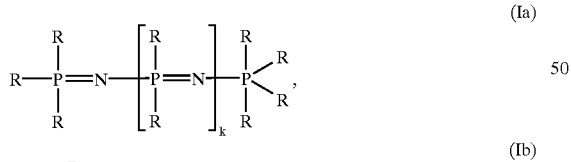
(Ia)

(Ib)

wherein

R is in each case identical or different and represents amino, $C_1$- to $C_8$-alkyl or $C_1$- to $C_8$-alkoxy, in each case optionally halogenated, preferably halogenated by fluorine, or $C_5$- to $C_6$-cycloalkyl, $C_6$- to $C_{20}$-aryl, preferably phenyl or naphthyl, $C_6$- to $C_{20}$-aryloxy, preferably phenoxy or naphthyloxy, or $C_7$- to $C_{12}$-aralkyl, preferably phenyl-$C_1$-$C_4$-alkyl, in each case optionally substituted by alkyl, preferably $C_1$-$C_4$-alkyl, and/or halogen, preferably chlorine and/or bromine, k represents 0 or a number from 1 to 15, preferably a number from 1 to 10.

The invention preferably provides thermoplastic moulding compositions comprising A) 40 to 99, preferably 60 to 98.5 parts by wt. of aromatic polycarbonate and/or polyester-carbonate B) 0.5 to 60, preferably 1 to 40, in particular 2 to 25 parts by wt. of at least one rubber-elastic graft polymer chosen from the group consisting of silicone rubbers, EP(D)M rubbers and acrylate rubbers as the graft base, C) 0 to 45, preferably 0 to 30, particularly preferably 2 to 25 parts by wt. of at least one thermoplastic polymer chosen from the group consisting of vinyl (co)polymers and polyalkylene terephthalates, D) 0.1 to 50, preferably 2 to 35, in particular 5 to 25 parts by wt. of at least one component chosen from the group consisting of phosphazenes of the formulae

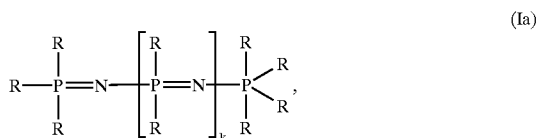
(Ia)

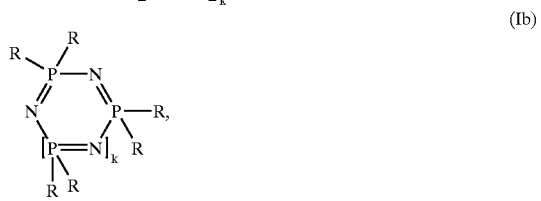
(Ib)

wherein

R is in each case identical or different and represents amino, $C_1$- to $C_8$-alkyl or $C_1$ to $C_8$-alkoxy, in each case optionally halogenated, preferably halogenated by fluorine, or $C_5$- to $C_6$-cycloalkyl, $C_6$- to $C_{20}$-aryl, preferably phenyl or naphthyl, $C_6$- to $C_{20}$-aryloxy, preferably phenoxy or naphthyloxy, or $C_7$- to $C_{12}$-aralkyl, preferably phenyl-$C_1$-$C_4$-alkyl, in each case optionally substituted by alkyl, preferably $C_1$-$C_4$-alkyl, and/or halogen, preferably chlorine and/or bromine, k represents 0 or a number from 1 to 15, preferably a number from 1 to 10.

E) 0 to 5, preferably 0.1 to 1, particularly preferably 0.1 to 0.5 parts by wt. of fluorinated polyolefin.

Component A

Aromatic polycarbonates and/or aromatic polyester-carbonates according to component A which are suitable according to the invention are known from the literature or can be prepared by processes known from the literature (for the preparation of aromatic polycarbonates see, for example, Schnell, "Chemistry and Physics of Polycarbonates", Interscience Publishers, 1964 and DE-AS 1 495 626, DE-OS 2 232 877, DE-OS 2 703 376, DE-OS 2 714 544, DE-OS 3 000 610 and DE-OS 3 832 396; for the preparation of aromatic polyester-carbonates e.g. DE-OS 3 077 934).

Aromatic polycarbonates are prepared e.g. by reaction of diphenols with carbonic acid halides, preferably phosgene, and/or with aromatic dicarboxylic acid dihalides, preferably benzenedicarboxylic acid dihalides, by the phase boundary process, optionally using chain stoppers, for example monophenols, and optionally using trifunctional or more than trifunctional branching agents, for example triphenols or tetraphenols.

Diphenols for the preparation of the aromatic polycarbonates and/or aromatic polyester-carbonates are preferably those of the formula (III)

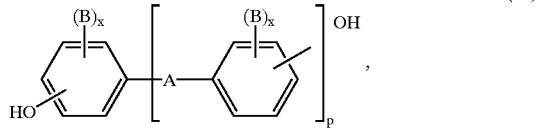

(III)

wherein
A is a single bond, $C_1$–$C_5$-alkylene, $C_2$–$C_5$-alkylidene, $C_5$–$C_6$-cycloalkylidene, —O—, —SO—, —CO—, —S—, —$SO_2$—, $C_6$–$C_{12}$-arylene, to which further aromatic rings optionally containing heteroatoms can be fused,
or a radical of the formula (IV) or (V)

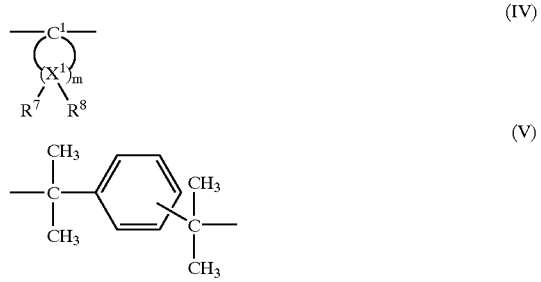

(IV)

(V)

B in each case is $C_1$–$C_{12}$-alkyl, preferably methyl, or halogen, preferably chlorine and/or bromine,
x in each case independently of one another is 0, 1 or 2,
p is 1 or 0, and
$R^7$ and $R^8$ can be chosen individually for each $X^1$ and independently of one another denote hydrogen or $C_1$–$C_6$-alkly, preferably hydrogen, methyl or ethyl,
$X^1$ denotes carbon and
m denotes an integer from 4 to 7, preferably 4 or 5, with the proviso that on at least one atom $X^1$, $R^7$ and $R^8$ are simultaneously alkyl.

Preferred diphenols are hydroquinone, resorcinol, dihydroxydiphenols, bis-(hydroxyphenyl)-$C_{1-C_5}$-alkanes, bis-(hydroxyphenyl)-$C_5$–$C_6$-cycloalkanes, bis-(hydroxyphenyl) ethers, bis-(hydroxyphenyl)-sulfoxides, bis-(hydroxyphenyl) ketones, bis-(hydroxyphenyl) sulfones and α,α-bis-(hydroxyphenyl)-diisopropyl-benzenes, and derivatives thereof brominated on the nucleus and/or chlorinated on the nucleus.

Particularly preferred diphenols are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone and di- and tetrabrominated or -chlorinated derivatives thereof, such as, for example, 2,2-bis-(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane.

2,2-Bis-(4-hydroxyphenyl)-propane (bisphenol A) is particularly preferred.

The diphenols can be employed individually or as any desired mixtures.

The diphenols are known from the literature or are obtainable by processes known from the literature.

Chain stoppers which are suitable for the preparation of the thermoplastic aromatic polycarbonates are, for example, phenol, p-chlorophenol, p-tert-butylphenol or 2,4,6-tribromophenol, and also long-chain alkylphenols, such as 4-(1,3-tetramethylbutyl)-phenol according to DE-OS 2 842 005, or monoalkylphenols or dialkylphenols having a total of 8 to 20 C atoms in the alkyl substituents, such as 3,5-di-tert-butylphenol, p-iso-octylphenol, p-tert-octylphenol, p-dodecylphenol and 2-(3,5-dimethylheptyl)-phenol and 4-(3,5-dimethylheptyl)-phenol. The amount of chain stoppers to be employed is in general between 0.5 mole % and 10 mole %, based on the sum of the moles of the particular diphenols employed.

The thermoplastic aromatic polycarbonates have average weight-average molecular weights ($M_w$, measured e.g. by ultracentrifuge or scattered light measurement) of 10,000 to 200,000, preferably 20,000 to 80,000.

The thermoplastic aromatic polycarbonates can be branched in a known manner, and in particular preferably by the incorporation of 0.05 to 2.0 mole %, based on the sum of the diphenols employed, of trifunctional or more than trifunctional compounds, for example those having three or more phenolic groups.

Both homopolycarbonates and copolycarbonates are suitable. For the preparation of copolycarbonates according to the invention according to component A, it is also possible to employ 1 to 25 wt. %, preferably 2.5 to 25 wt. % (based on the total amount of diphenols to be employed) of polydiorganosiloxanes with hydroxy-aryloxy end groups. These are known (see, for example, U.S. Pat. No. 3,419,634) or can be prepared by processes known from the literature. The preparation of polydiorganosiloxane-containing copolycarbonates is described e.g. in DE-OS 3 334 782.

Preferred polycarbonates are, in addition to the bisphenol A homopolycarbonates, the copolycarbonates of bisphenol A with up to 15 mole %, based on the sum of the moles of diphenols, of other diphenols mentioned as preferred or particularly preferred, in particular 2,2-bis-(3,5-dibromo-4-hydroxyphenyl)-propane.

Aromatic dicarboxylic acid dihalides for the preparation of aromatic polyester-carbonates are preferably the di-acid dichlorides of isophthalic acid, terephthalic acid, diphenyl ether-4,4'-dicarboxylic acid and naphthalene-2,6-dicarboxylic acid.

Mixtures of the di-acid dichlorides of isophthalic acid and terephthalic acid in a ratio of between 1:20 and 20:1 are particularly preferred.

A carbonic acid halide, preferably phosgene, is additionally co-used as a bifunctional acid derivative in the preparation of polyester-carbonates.

Possible chain stoppers for the preparation of the aromatic polyester-carbonates are, in addition to the monophenols already mentioned, also chlorocarbonic acid esters thereof, as well as the acid chlorides of aromatic monocarboxylic acids, which can optionally be substituted by $C_1$–$C_{22}$-alkyl groups or by halogen atoms, and aliphatic $C_2$–$C_{22}$-monocarboxylic acid chlorides.

The amount of chain stoppers is in each case 0.1 to 10 mole %, based on the moles of diphenols in the case of the phenolic chain stoppers and on the moles of dicarboxylic acid dichlorides in the case of monocarboxylic acid chloride chain stoppers.

The aromatic polyester-carbonates can also contain incorporated aromatic hydroxycarboxylic acids.

The aromatic polyester-carbonates can be both linear and branched in a known manner (in this context see also DE-OS 2 940 024 and DE-OS 3 007 934).

Branching agents which can be used are, for example, trifunctional or more than trifunctional carboxylic acid chlorides, such as trimesic acid trichloride, cyanuric acid trichloride, 3,3',4,4'-benzophenone-tetracarboxylic acid tetrachloride, 1,4,5,8-naphthalenetetracarboxylic acid tetrachloride or pyromellitic acid tetrachloride, in amounts of 0.01 to 1.0 mole % (based on the dicarboxylic acid dichlorides employed), or trifunctional or more than trifunctional phenols, such as phloroglucinol, 4,6-dimethyl-2,4,6-tri-(4-hydroxyphenyl)-hept-2-ene, 4,4-dimethyl-2,4,6-tri-(4-hydroxy-phenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, tetra-(4-hydroxyphenyl)-methane, 2,6-bis-(2-hydroxy-5-methyl-benzyl)-4-methyl-phenol,2-(4-hydroxy-phenyl)-2-(2,4-dihydroxyphenyl)-propane, tetra-(4-[4-hydroxy-phenylisopropyl]-phenoxy)-methane or 1,4-bis-[4,4'-dihydroxytriphenyl)-methyl]-benzene, in amounts of 0.01 to 1.0 mole %, based on the diphenols employed. Phenolic branching agents can be initially introduced into the reaction vessel together with the diphenols, and acid chloride branching agents can be introduced together with the acid dichlorides.

The content of carbonate structural units in the thermoplastic aromatic polyester-carbonates can be varied as desired. The content of carbonate groups is preferably up to 100 mole %, in particular up to 80 mole %, particularly preferably up to 50 mole %, based on the sum of ester groups and carbonate groups. Both the ester and the carbonate content of the aromatic polyester-carbonates can be present in the polycondensate in the form of blocks or in random distribution.

The relative solution viscosity ($\eta_{rel}$) of the aromatic polycarbonates and polyester-carbonates is in the range of 1.18 to 1.4, preferably 1.22 to 1.3 (measured on solutions of 0.5 g polycarbonate or polyester-carbonate in 100 ml methylene chloride solution at 25° C.).

The thermoplastic aromatic polycarbonates and polyester-carbonates can be employed by themselves or in any desired mixture with one another.

Component B

Component B comprises one or more rubber-elastic graft polymers chosen from the group consisting of silicone rubbers, acrylate rubbers and EP(D)M rubbers as the graft base.

Component B preferably comprises one or more graft polymers of

B.1 5 to 95, preferably 20 to 80, in particular 30 to 80 wt. % of at least one vinyl monomer on B.2 95 to 5, preferably 80 to 20, in particular 70 to 20 wt. % of one or more graft bases having glass transition temperatures of <10° C., preferably <0° C., particularly preferably <−20° C., chosen from the group consisting of silicone rubbers, acrylate rubbers and EP(D)M rubbers.

Graft base B.2 in general has an average particle size ($d_{50}$ value) of 0.05 to 5 μm, preferably 0.10 to 0.5 μm, particularly preferably 0.20 to 0.40 μm.

Monomers B.1 are preferably mixtures of

B.1.1 50 to 99, preferably 60 to 80 parts by wt. of vinylaromatics and/or vinylaromatics substituted on the nucleus (such as, for example, styrene, α-methylstyrene, p-methylstyrene and p-chlorostyrene) and/or methacrylic acid ($C_1$–$C_8$)-alkyl esters (such as e.g. methyl methacrylate and ethyl methacrylate) and B.1.2 1 to 50, preferably 40 to 20 parts by wt. of vinyl cyanides (unsaturated nitriles, such as acrylonitrile and methacrylonitrile) and/or (meth)acrylic acid ($C_1$–$C_8$)-alkyl esters (such as e.g. methyl methacrylate, n-butyl acrylate and t-butyl acrylate) and/or derivatives (such as anhydrides and imides) of unsaturated carboxylic acids (for example maleic anhydride and N-phenyl-maleimide).

Preferred monomers B.1.1 are chosen from at least one of the monomers styrene, α-methylstyrene and methyl methacrylate, and preferred monomers B.1.2 are chosen from at least one of the monomers acrylonitrile, maleic anhydride and methyl methacrylate.

Particularly preferred monomers are B.1.1 styrene and B.1.2 acrylonitrile.

Silicone rubbers B.2 which are suitable according to the invention consist predominantly of structural units

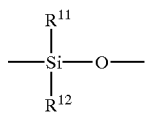

wherein $R^{11}$ and $R^{12}$ can be identical or different and denote $C_1$–$C_6$-alkyl or cycloalkyl or $C_6$–$C_{12}$ aryl.

Preferred silicone rubbers B.2 are in particle form with an average particle diameter $d_{50}$ of 0.09 to 1 μm, preferably 0.09 to 0.4 μm, and a gel content of more than 70 wt. %, in particular 73 to 98 wt. %, and are obtainable from 1) dihalogeno-organosilanes 2) 0 to 10 mole %, based on 1), of trihalogenosilanes and 3) 0 to 3 mole %. based on 1), of tetrahalogenosilanes and 4) 0 to 0.5 mole %, based on 1), of halogenotriorganosilanes, wherein the organic radicals in compounds 1), 2) and 4) are α) $C_1$–$C_6$-alkyl or cyclohexyl, preferably methyl or ethyl, β) $C_6$–$C_{12}$-aryl, preferably phenyl, γ) $C_1$–$C_6$-alkenyl, preferably vinyl or allyl, δ) mercapto-$C_1$–$C_6$-alkyl, preferably mercaptopropyl with the proviso that the sum (γ+δ) is 2 to 10 mole %, based on all the organic radicals of the compounds 1), 2) and 4), and the molar ratio γ:δ=3:1 to 1:3, preferably 2:1 to 1:2.

Preferred silicone rubbers B.2 contain as organic radicals at least 80 mole % methyl groups. The end group is in general a diorganyl-hydroxyl-siloxy unit, preferably a dimethylhydroxysiloxy unit.

Preferred silanes 1) to 4) for the preparation of silicone rubbers B.2 contain chlorine as the halogen substituent.

"Obtainable" means that silicone rubber B.2 does not necessarily have to be prepared from the halogen compounds 1) to 4). Silicone rubbers B.2 of the same structure which have been prepared from silanes with other hydrolysable groups, such as e.g. $C_1$–$C_6$-alkoxy groups, or from cyclic siloxane oligomers are also intended to be included.

Silicone graft rubbers are mentioned as a particularly preferred component B.2. These can be prepared, for example, by a three-stage process.

In the first stage, monomers such as dimethyldichlorosilane, vinylmethyldichlorosilane or dichlorosilanes with other substituents are reacted to give the cyclic oligomers (octamethylcyclotetrasiloxane or tetravinyltetramethylcyclotetrasiloxane) which can easily be purified by distillation (cf. Chemie in unserer Zeit 4 (1987), 121–127).

In the second stage, the crosslinked silicone rubbers are obtained from these cyclic oligomers by ring-opening cationic polymerization with the addition of mercaptopropylmethyldimethoxysilane.

In the third stage, the silicone rubbers obtained, which have grafting-active vinyl and mercapto groups, are subjected to free-radical grafting polymerization with vinyl monomers (or mixtures).

In the second stage, preferably, mixtures of cyclic siloxane oligomers such as octamethylcyclotetrasiloxane and tetramethyltetravinylcyclo-tetrasiloxane are subjected to ring-opening cationic polymerization in emulsion. The silicone rubbers are obtained in particle form as an emulsion.

The process is particularly preferably carried out in accordance with GB-PS 1 024 014 with alkylbenzenesulfonic acids, which act both catalytically and as an emulsifier. After the polymerization, the acid is neutralized. Instead of alkylbenzenesulfonic acids, n-alkylsulfonic acids can also be employed. It is also possible also additionally to employ co-emulsifiers, in addition to the sulfonic acid.

Co-emulsifiers can be nonionic or anionic. Possible anionic co-emulsifiers are, in particular, salts of n-alkyl- or alkylbenzenesulfonic acids. Nonionic co-emulsifiers are polyoxyethylene derivatives of fatty alcohols and fatty acids. Examples are POE (3)-lauryl alcohol, POE (20)-oleyl alcohol, POE (7)-nonyl alcohol or POE (10)-stearyl alcohol. (The terminology POE (number) . . . alcohol means that as many units of ethylene oxide as correspond to the number have been added on to one molecule of alcohol. POE represents polyethylene oxide. The number is an average value.)

The crosslinking- and grafting-active groups (vinyl and mercapto groups, cf. organic radicals $\gamma$ and $\delta$) can be introduced into the silicone rubber using corresponding siloxane oligomers. Such oligomers are e.g. tetramethyltetravinylcyclotetrasiloxane or γ-mercaptopropylmethyldimethoxysiloxane or the hydrolysis product thereof.

They are added to the main oligomer, e.g. octamethylcyclotetrasiloxane, in the desired amounts in the second stage.

The incorporation of longer-chain alkyl radicals, such as e.g. ethyl, propyl or the like, or the incorporation of phenyl groups can also be achieved analogously.

An adequate crosslinking of the silicon rubber can already be achieved if the radicals $\gamma$ and $\delta$ react with one another during the emulsion polymerization, so that the addition of an external crosslinking agent may be dispensable. However, a crosslinking silane can be added during the second reaction stage in order to increase the degree of crosslinking of the silicone rubber.

Branchings and crosslinkings can be achieved by addition of e.g. tetraethoxysilane or a silane of the formula $$y\text{-SiX}_3$$

wherein

X is a hydrolysable group, in particular an alkoxy or halogen radical, and y is an organic radical.

Preferred silanes y-SiX$_3$ are methyltrimethoxysilane and phenyltrimethoxysilane.

The gel content is determined at 25° C. in acetone (cf. DE-AS 2 521 288, col. 6, 1. 17 to 37). In the silicone rubbers according to the invention, it is at least 70%, preferably 73 to 98 wt. %.

Grafted silicone rubbers B can be prepared by free-radical grafting polymerization, for example analogously to DE-PS 2 421 288.

For the preparation of the grafted silicone rubber in the third stage, the grafting monomers can be subjected to free-radical grafting polymerization in the presence of the silicone rubber, in particular at 40 to 90° C. The grafting polymerization can be carried out in suspension, dispersion or emulsion. Continuous or discontinuous emulsion polymerization is preferred. This grafting polymerization is carried out with free-radical initiators (e.g. peroxides, azo compounds, hydroperoxides, persulfates and perphosphates) and optionally using anionic emulsifiers, e.g. carboxonium salts, sulfonic acid salts or organic sulfates. Graft polymers with high grafting yields, i.e. a high content of the grafting monomers in the polymer is bonded chemically to the silicon rubber, are formed by this procedure. The silicone rubber has grafting-active radicals, so that particular measures for intensive grafting are superfluous.

The grafted silicon rubbers can be prepared by grafting polymerization of 5 to 95 parts by wt., preferably 20 to 80 parts by wt. of a vinyl monomer or vinyl monomer mixture on to 5 to 95, preferably 20 to 80 parts by wt. silicone rubber.

A particularly preferred vinyl monomer is styrene or methyl methacrylate. Suitable vinyl monomer mixtures comprise 50 to 95 parts by wt. styrene, α-methylstyrene (or other styrenes substituted by alkyl or halogen on the nucleus) or methyl methacrylate on the one hand and 5 to 50 parts by wt. acrylonitrile, methacrylonitrile, acrylic acid $C_1$–$C_{18}$-alkly ester, methacrylic acid $C_1$–$C_{16}$-alkyl ester, maleic anhydride or substituted maleimides on the other hand. Acrylic acid esters of primary or secondary aliphatic $C_2$–$C_{10}$-alcohols, preferably n-butyl acrylate, or acrylic or methacrylic acid esters of tert-butanol, preferably t-butyl acrylate, can additionally be present in smaller amounts as further vinyl monomers. A particularly preferred monomer mixture is 30 to 40 parts by wt. α-methylstyrene, 52 to 62 parts by wt. methyl methacrylate and 4 to 14 parts by wt. acrylonitrile.

The silicone rubbers grafted in this way can be worked up in a known manner, e.g. by coagulation of the latices with electrolytes (salts, acids or mixtures thereof) and subsequent purification and drying.

In the preparation of the grafted silicone rubbers, in addition to the actual graft copolymers, in general free polymers or copolymers of the grafting monomers which form the graft shell are also formed to a certain extent. In this case, the product obtained by polymerization of the grafting monomers in the presence of the silicone rubber, strictly speaking, that is to say, in general a mixture of graft copolymer and free (co)polymer of the grafting monomers, is called grafted silicone rubber.

Acrylate-based graft polymers preferably comprise (a) 20 to 90 wt. %, based on the graft polymer, of acrylate rubber having a glass transition temperature below −20° C. as the graft base and (b) 10 to 80 wt. %, based on the graft polymer, of at least one polymerizable ethylenically unsaturated monomer (cf. B.1) as the grafting monomer.

The acrylate rubbers (a) are preferably polymers of acrylic acid alkyl esters, optionally with up to 40 wt. %, based on (a), of other polymerizable ethylenically unsaturated monomers. Preferred polymerizable acrylic acid esters include $C_1$–$C_8$-alkyl esters, for example methyl, ethyl, butyl, n-octyl and 2-ethylhexyl esters; halogenoalkyl esters, preferably halogeno-$C_1$–$C_8$-alkyl esters, such as chloroethyl acrylate, and mixtures of these monomers.

For the crosslinking, monomers with more than one polymerizable double bond can be copolymerized. Preferred examples of crosslinking monomers are esters of unsaturated monocarboxylic acids having 3 to 8 C atoms and unsaturated monohydric alcohols having 3 to 12 C atoms, or saturated polyols having 2 to 4 OH groups and 2 to 20 C atoms, such as e.g. ethylene glycol dimethacrylate and allyl methacrylate; polyunsaturated heterocyclic compounds, such as e.g. trivinyl and triallyl cyanurate; polyfunctional vinyl compounds, such as di- and trivinylbenzenes; and also triallyl phosphate and diallyl phthalate.

Preferred crosslinking monomers are allyl methacrylate, ethylene glycol dimethacrylate, diallyl phthalate and heterocyclic compounds which contain at least 3 ethylenically unsaturated groups.

Particularly preferred crosslinking monomers are the cyclic monomers triallyl cyanurate, triallyl isocyanurate, triacryloylhexahydro-s-triazine and triallylbenzenes.

The amount of crosslinking monomers is preferably 0.02 to 5, in particular 0.05 to 2 wt. %, based on the rubber base.

In the case of cyclic crosslinking monomers with at least 3 ethylenically unsaturated groups, it is advantageous to limit the amount to less than 1 wt. % of the rubber base.

Preferred "other" polymerizable ethylenically unsaturated monomers which can optionally be used in addition to the acrylic acid esters for the preparation of graft base B.2 are e.g. acrylonitrile, styrene, α-methylstyrene, acrylamides, vinyl $C_1$–$C_6$-alkyl ethers, methyl methacrylate and butadiene. Preferred acrylate rubbers as graft base B.2 are emulsion polymers which have a gel content of at least 60 wt. %.

The acrylate-based polymers are generally known, can be prepared by known processes (e.g. EP-A 244 857) or are commercially obtainable products.

The gel content of the graft base is determined at 25° C. in a suitable solvent (M. Hoffmann, H. Krömer, R. Kuhn, Polymeranalytik [Polymer Analysis] I and II, Georg Thieme-Verlag, Stuttgart 1977).

The average particle size $d_{50}$ is the diameter above and below which in each case 50 wt. % of the particles lie. It can be determined by means of ultracentrifuge measurement (W. Scholtan, H. Lange, Kolloid. Z. und Z. Polymere 250 (1972), 782–1796).

At least one ethylene- and propylene-containing copolymer or terpolymer with only a low number of double bonds is employed as the EP(D)M graft base (cf. EP-A 163 411, EP-A 244 857).

EP(D)M rubbers which are used are those which have a glass transition temperature in the range of –60 to –40° C. The rubbers have only a low nunber of double bonds, i.e. fewer than 20 double bonds per 1,000 C atoms, in particular 3 to 10 double bonds per 1,000 C atoms. Examples of such rubbers are copolymers comprising ethylene-propylene, and ethylene-propylene terpolymers. The latter are prepared by polymerization of at least 30 wt. % ethylene, at least 30 wt. % propylene and 0.5 to 15 wt. % of a non-conjugated diolefinic component. Diolefins having at least 5 carbon atoms, such as 5-ethylidenenorbornene, dicyclopentadiene, 2,2,1-dicyclopentadiene and 1,4-hexadiene, are as a rule used as the ternary component. Polyalkenamers, such as polypentenamer, polyoctenamer, polydodecenamer or mixtures of these substances, are used as a rule. Partly hydrogenated polybutadiene rubbers in which at least 70% of the residual double bonds are hydrogenated are furthermore also possible. Of the abovementioned rubbers, the ethylene-propylene copolymers and the ethylene-propylene terpolymers (EPDM) rubbers are used in particular. As a rule, EPDM rubbers have a Mooney viscosity $ML_{1-4}$ (100° C.) of 25 to 120. They are commercially obtainable.

The EP(D)M-based graft polymer can be prepared by various methods. Preferably, a solution of the EP(D)M elastomer (rubber) in the monomer mixture and (optionally) inert solvents is prepared and the grafting reaction is carried out by free-radical initiators, such as azo compounds or peroxides, at elevated temperatures. The processes of DE-AS 23 02 014 and DE-OS 25 33 991 may be mentioned as examples. It is also possible to carry out the reaction in suspension, as described in U.S. Pat. No. 4,202,948.

Component C

Component C comprises one or more thermoplastic vinyl (co)polymers C.1 and/or polyalkylene terephthalates C.2.

Suitable vinyl (co)polymers C.1 are polymers of at least one monomer from the group consisting of vinylaromatics, vinyl cyanides (unsaturated nitrites), (meth)acrylic acid ($C_1$–$C_8$)-alkyl esters, unsaturated carboxylic acids and derivatives (such as anhydrides and imides) of unsaturated carboxylic acids. Particularly suitable (co)polymers are those of C.1.1 50 to 99, preferably 60 to 80 parts by wt. of vinylaromatics and/or vinylaromatics substituted on the nucleus (such as, for example, styrene, α-methylstyrene, p-methylstyrene and p-chlorostyrene) and/or methacrylic acid ($C_1$–$C_8$)-alkyl esters (such as e.g. methyl methacrylate and ethyl methacrylate), and C.1.2 1 to 50, preferably 20 to 40 parts by wt. of vinyl cyanides (unsaturated nitriles), such as acrylonitrile and methacrylonitrile, and/or (meth)acrylic acid ($C_1$–$C_8$)-alkyl esters (such as e.g. methyl methacrylate, n-butyl acrylate and t-butyl acrylate) and/or unsaturated carboxylic acids (such as maleic acid) and/or derivatives (such as anhydrides and imides) of unsaturated carboxylic acids (for example maleic anhydride and N-phenyl-maleimide).

(Co)polymers C.1.1 are resinous, thermoplastic and rubber-free.

The copolymer of C.1.1 styrene and C.1.2 acrylonitrile is particularly preferred.

(Co)polymers according to C.1 are known and can be prepared by free-radical polymerization, in particular by emulsion, suspension, solution or bulk polymerization. The (co)polymers preferably have molecular weights $\overline{M}_w$ (weight-average, determined by light scattering or sedimentation) of between 15,000 and 200,000. (Co) polymers according to component C.1 are often formed as by-products in the grafting polymerization of component B, especially if large amounts of monomers B.1 are grafted on to small amounts of rubber B.2. The amount of C.1 optionally also to be employed according to the invention does not include these by-products of the grafting polymerization of B.

The polyalkylene terephthalates of component C.2 are reaction products of aromatic dicarboxylic acids or their reactive derivatives, such as dimethyl esters or anhydrides, and aliphatic, cycloaliphatic or araliphatic diols, and mixtures of these reaction products.

Preferred polyalkylene terephthalates contain at least 80 wt. %, preferably at least 90 wt. %, based on the dicarboxylic acid component, of terephthalic acid radicals and at least 80 wt. %, preferably at least 90 mole %, based on the diol component, of ethylene glycol and/or butane-1,4-diol radicals.

The preferred polyalkylene terephthalates can contain, in addition to terephthalic acid radicals, up to 20 mole %, preferably up to 10 mole % of radicals of other aromatic or cycloaliphatic dicarboxylic acids having 8 to 14 C atoms or aliphatic dicarboxylic acids having 4 to 12 C atoms, such as e.g. radicals of phthalic acid, isophthalic acid, naphthalene-2,6-dicarboxylic acid, 4,4'-diphenyldicarboxylic acid, succinic acid, adipic acid, sebacic acid, azelaic acid or cyclohexane-diacetic acid.

The preferred polyalkylene terephthalates can contain, in addition to ethylene glycol or butane-1,4-diol radicals, up to 20 mole %, preferably up to 10 mole %, of other aliphatic diols having 3 to 12 C atoms or cycloaliphatic diols having 6 to 21 C atoms, e.g. radicals of propane-1,3-diol, 2-ethylpropane-1,3-diol, neopentylglycol, pentane-1,5-diol, hexane-1,6-diol, cyclohexane-1,4-dimethanol, 3-ethylpentane-2,4-diol, 2-methylpentane-2,4-diol, 2,2,4-trimethylpentane-1,3-diol, 2-ethylhexane-1,3-diol, 2,2-diethylpropane-1,3-diol, hexane-2,5-diol, 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(4-β-hydroxyethoxy-phenyl)-propane and 2,2-bis-(4-hydroxypropoxyphenyl)-propane (DE-OS 2 407 674, 2 407 776 and 2 715 932).

The polyalkylene terephthalates can be branched by incorporation of relatively small amounts of 3- or 4-hydric alcohols or 3- or 4-basic carboxylic acids, e.g. in accordance with DE-OS 1 900 270 and U.S. Pat. No. 3,692,744. Examples of preferred branching agents are trimesic acid, trimellitic acid, trimethylolethane and -propane and pentaerythritol.

Polyalkylene terephthalates which have been prepared solely from terephthalic acid and reactive derivatives thereof (e.g. dialkyl esters thereof) and ethylene glycol and/or butane-1,4-diol, and mixtures of these polyalkylene terephthalates are particularly preferred.

Mixtures of polyalkylene terephthalates comprise 1 to 50 wt. %, preferably 1 to 30 wt. % polyethylene terephthalate and 50 to 99 wt. %, preferably 70 to 99 wt. % polybutylene terephthalate.

The polyalkylene terephthalates preferably used in general have a limiting viscosity of 0.4 to 1.5 dl/g, preferably 0.5 to 1.2 dl/g, measured in phenol/o-dichlorobenzene (1:1 parts by weight) at 25° C. in an Ubbelohde viscometer.

The polyalkylene terephthalates can be prepared by known methods (see e.g. Kunststoff-Handbuch [Plastics Handbook], volume VIII, p. 695 et seq., Carl-Hanser-Verlag, Munich 1973).

Component D

Phosphazenes according to component D which are employed according to the present invention are linear phosphazenes according to formula (Ia) and cyclic phosphazenes according to formula (Ib)

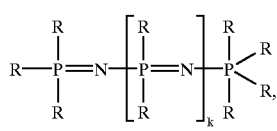
(Ia)

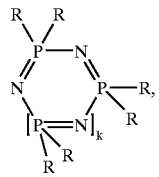
(Ib)

wherein
k and R have the meaning given above.

Examples which may be mentioned are: propoxyphosphazene, phenoxyphosphazene, methylphenoxyphosphazene, amino-phosphazene and fluoroalkylphosphazenes.

Phenoxyphosphazene is preferred.

The phosphazenes can be employed by themselves or as a mixture. The radical R can always be the same, or 2 or more radicals in the formulae (Ia) and (Ib) can be different.

The phosphazenes and their preparation are described, for example, in EP-A 728 811, DE-A 1 961 668 and WO 97/40092.

Component E

The fluorinated polyolefins E are of high molecular weight and have glass transition temperatures of above -30° C., as a rule above 100° C., fluorine contents preferably of 65 to 76, in particular 70 to 76 wt. % and average particle diameters $d_{50}$ of 0.05 to 1,000, preferably 0.08 to 20 μm. In general, the fluorinated polyolefins F have a density of 1.2 to 2.3 g/cm$^3$. Preferred fluorinated polyolefins F are polytetrafluoroethylene, polyvinylidene fluoride and tetrafluoroethylene/hexafluoropropylene and ethylene/tetrafluoroethylene copolymers. The fluorinated polyolefins are known (cf. "Vinyl and Related Polymers" by Schildknecht, John Wiley & Sons, Inc., New York, 1962, page 484–494; "Fluorpolymers" [Fluoropolymers] by Wall, Wiley-Interscience, John Wiley & Sons, Inc., New York, volume 13, 1970, page 623–654; "Modern Plastics Encyclopedia", 1970–1971, volume 47, no. 10 A, October 1970, McGraw-Hill, Inc., New York, page 134 and 774; "Modern Plastics Encyclopedia", 1975–1976, October 1975, volume 52, no. 10 A, McGraw-Hill, Inc., New York, page 27, 28 and 472 and U.S. Pat. Nos. 3,671,487, 3,723,373 and 3,838,092).

They can be prepared by known processes. thus, for example, by polymerization of tetrafluoroethylene in an aqueous medium with a catalyst which forms free radicals, for example sodium peroxydisulfate, potassium peroxydisulfate or ammonium peroxydisulfate, under pressures of 7 to 71 kg/cm$^2$ and at temperatures of 0 to 200° C., preferably at temperatures of 20 to 100° C. (For further details see e.g. U.S. Pat. No. 2,393,967). The density of these materials can be between 1.2 and 2.3 g/cm$^3$ and the average particle size between 0.5 and 1,000 μm, depending on the use form.

Fluorinated polyolefins E which are preferred according to the invention are tetrafluoroethylene polymers having an average particle diameter of 0.05 to 20 μm, preferably 0.08 to 10 μm, and a density of 1.2 to 1.9 g/cm$^3$, and are preferably employed in the form of a coagulated mixture of emulsions of tetrafluoroethylene polymers E with emulsions of the graft polymers.

Suitable fluorinated polyolefins E which can be employed in powder form are tetrafluoroethylene polymers having an average particle diameter of 100 to 1,000 μm and densities of 2.0 g/cm$^3$ to 2.3 g/cm$^3$.

To prepare a coagulated mixture of graft polymer and component E, an aqueous emulsion (latex) of a graft polymer B is first mixed with a finely divided emulsion of a tetraethylene polymer E; suitable tetrafluoroethylene polymer emulsions usually have solids contents of 30 to 70 wt. %, in particular 50 to 60 wt. %, preferably 30 to 35 wt. %.

The equilibrium ratio of graft polymer to tetrafluoroethylene polymer E in the emulsion mixture is 95:5 to 60:40. The emulsion mixture is then coagulated in a known manner, for example by spray drying, freeze drying or coagulation by means of addition of inorganic or organic salts, acids or bases or organic water-miscible solvents, such as alcohols or ketones, preferably at temperatures of 20 to 150° C., in particular 50 to 100° C. If necessary, the product can be dried at 50 to 200° C., preferably 70 to 100° C.

Suitable tetrafluoroethylene polymer emulsions are commercially conventional products and are available, for example, from DuPont as Teflon® 30 N.

The moulding compositions according to the invention can comprise at least one of the conventional additives, such as lubricants and mould release agents, nucleating agents, antistatics, stabilizers and dyestuffs and pigments.

The moulding compositions according to the invention can comprise up to 35 wt. %, based on the total moulding composition, of a further flameproofing agent which optionally has a synergistic action. Examples of further flameproofing agents which are mentioned are organic phosphorus compounds, such as triphenyl phosphate or m-phenylene-bis-(diphenyl phosphate), organic halogen compounds, such as decabromobisphenyl ether and tetrabromobisphenol, inorganic halogen compounds, such as ammonium bromide, nitrogen compounds, such as melamine and melamine-formaldehyde resins, inorganic hydroxide compounds, such as Mg hydroxide and Al hydroxide, inorganic compounds such as antimony oxides, barium metaborate, hydroxoantimonate, zirconium oxide, zirconium hydroxide, molybdenum oxide, ammonium molybdate, zinc borate, ammonium borate, barium metaborate, talc, silicate, silicon oxide and tin oxide, and siloxane compounds.

The moulding compositions according to the invention comprising components A to E and optionally further known additives, such as stabilizers, dyestuffs, pigments, lubricants and mould release agents, nucleating agents and antistatics, are prepared by mixing the particular constituents in a known manner and subjecting the mixture to melt compounding and melt extrusion at temperatures of 200° C. to 300° C. in conventional units, such as internal kneaders, extruders and twin-screw extruders, component E preferably being employed in the form of the coagulated mixture already mentioned.

The mixing of the individual constituents can be carried out in a known manner both successively and simultaneously, and in particular both at about 20° C. (room temperature) and at a higher temperature.

The invention therefore also provides a process for the preparation of the moulding compositions.

On the basis of their excellent flame resistance and their good mechanical properties, the thermoplastic moulding compositions according to the invention are suitable for the production of all types of shaped articles, in particular those with increased requirements of resistance to fracture and resistance to chemicals.

The moulding compositions according to the present invention can be used for the production of any type of shaped articles. In particular, shaped articles can be produced by injection moulding. Examples of shaped articles which can be produced are: any type of housing components, e.g. for domestic appliances, such as juice presses, coffee machines and mixers, and for office machines, such as monitors, printers and copiers, covering sheets for the building sector and components for the motor vehicle sector. They can furthermore be employed in the field of electrical engineering, because they have very good electrical properties.

The moulding compositions according to the invention can moreover be used, for example, for the production of the following shaped articles or mouldings:

interior fittings for railway vehicles (FR), hub caps, housings of electrical equipment containing small transformers, housings for equipment for dissemination and transmission of information, housings and lining for medical purposes, massage equipment and housings therefor, toy vehicles for children, flat wall elements, housings for safety equipment, rear spoilers, thermally insulated transportation containers, devices for housing or care of small animals, mouldings for sanitary and bath fittings, covering grids for ventilator openings, mouldings for garden and equipment buildings, housings for garden equipment.

Another form of processing is the production of shaped articles by thermoforming from previously produced sheets or films.

The present invention therefore also provides the use of the moulding compositions according to the invention for the production of all types of shaped articles, preferably those mentioned above, and the shaped articles produced from the moulding compositions according to the invention.

EXAMPLES

Component A

Linear polycarbonate based on bisphenol A with a relative solution viscosity of 1.26, measured in $CH_2Cl_2$ as the solvent at 25° C. and a concentration of 0.5 g/100 ml.

Component B

B.1 Silicone Graft Rubber

1. Preparation of the Silicone Rubber Emulsion 38.4 parts by wt. octamethylcyclotetrasiloxane, 1.2 parts by wt. tetramethyltetravinylcyclotetrasiloxane and 1 part by wt. Mercaptopropyl-methyldimethoxysilane are stirred with one another. 0.5 part by wt. dodecylbenzenesulfonic acid is added, and 58.4 parts by wt. water are then added in the course of one hour. During this procedure the mixture is stirred intensively. The pre-emulsion is homogenized twice with the aid of a high-pressure emulsifying machine under 200 bar. A further 0.5 part by wt. dodecylbenzenesulfonic acid is added. The emulsion is stirred for 2 hours at 85° C. and then for 36 hours at 20° C. It is neutralized with the aid of 5N NaOH. A stable emulsion with a solids content of approx. 36 wt. % results. The polymer has a gel content of 82 wt. %, measured in toluene; the average particle diameter $d_{50}$ is 300 nm.

2. Preparation of the Grafted Silicone Rubber

The following are initially introduced into a reactor:

2,107 parts by wt. latex according to 1) and 1,073 parts by wt. water.

After initiation with a solution of 7.5 parts by wt. potassium peroxydisulfate in 195 parts by wt. water at 65° C., in each case the following solutions are fed in uniformly in the course of 4 hours for preparation of the graft rubber:

Solution 1:
 540 parts by wt. styrene and
 210 parts by wt. acrylonitrile;
Solution 2:
 375 parts by wt. water and
 15 parts by wt. of the sodium salt of $C_{14}$–$C_{18}$-alkylsulfonic acids The polymerization is then in each case brought to completion in the course of 6 hours at 65° C. A latex with a solids content of approx. 33 wt. % results.

After coagulation with an aqueous magnesium chloride/acetic acid solution, filtration and drying in vacuo, the graft polymers are obtained in the form of white powders.

B.2 Acrylate Graft Rubber

Graft polymer of 40 parts by wt. of a copolymer of styrene and acrylonitrile in a ratio of 72:28 on 60 parts by wt. crosslinked polyacrylate rubber in particle form (average particle diameter $d_{50}$=0.5 μm) prepared by emulsion polymerization.

B.3 EPDM Graft Rubber

Graft polymer of 50 parts by wt. of a copolymer of styrene and acrylonitrile in a ratio of 72:28 on 50 parts by wt. crosslinked EPDM rubber from Uniroyal Chemical Company, tradename Royaltuf 372 P29.

B.4

Graft polymer of 45 parts by wt. of a copolymer of styrene and acrylonitrile in a ratio of 72:28 on 55 parts by wt. crosslinked polybutadiene rubber in particle form (average particle diameter $d_{50}$=0.40 μm) prepared by emulsion polymerization.

Component C

Styrene/acrylonitrile copolymer with a styrene/acrylonitrile weight ratio of 72:28 and a limiting viscosity of 0.55 dl/g (measurement in dimethylformamide at 20° C.).

Component D

Phenoxyphosphazene of the formula

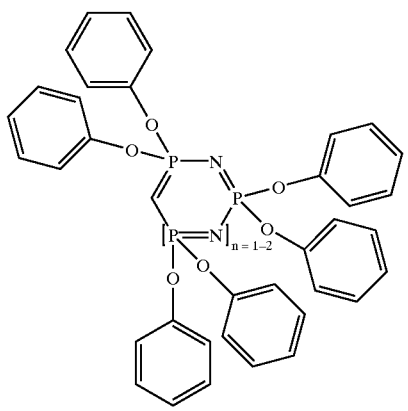

Commercial product P-3800 from Nippon Soda Co., Ltd., Japan.

Component E

Tetrafluoroethylene polymer as a coagulated mixture of an SAN graft polymer emulsion (SAN graft polymer of 40 parts by wt. of a copolymer of styrene and acrylonitrile in a ratio of 73:27 on 60 parts by wt. of crosslinked polybutadiene rubber in particle form (average particle diameter $d_{50}$=0.28 μm) prepared by emulsion polymerization) in water and a tetrafluoroethylene polymer emulsion in water. The weight ratio of graft polymer to tetrafluoroethylene polymer E in the mixture is 90 wt. % to 10 wt. %. The tetrafluoroethylene polymer emulsion has a solids content of 60 wt. % and the average particle diameter is between 0.05 and 0.5 μm. The SAN graft polymer emulsion has a solids content of 34 wt. % and an average latex particle diameter of $d_{50}$=0.28 μm.

Preparation of E

The emulsion of the tetrafluoroethylene polymer (Teflon 30 N from DuPont) is mixed with the emulsion of the SAN graft polymer and the mixture is stabilized with 1.8 wt. %, based on the polymer solids, of phenolic antioxidants. The mixture is coagulated with an aqueous solution of $MgSO_4$ (Epsom salt) and acetic acid at pH 4 to 5 at 85 to 95° C. and filtered and the residue is washed until practically free from electrolytes, subsequently freed from most of the water by centrifugation and thereafter dried to a powder at 100° C. This powder can then be compounded with the further components in the units described.

Preparation and Testing of the Moulding Compositions According to the Invention

The components are mixed on a 3 Internal kneader. The shaped articles are produced on an injection moulding machine type Arburg 270 E at 260° C.

The Vicat B heat distortion point is determined in accordance with DIN 53 460 (ISO 306) on bars of dimensions 80×10×4 mm.

The stress cracking properties (ESC properties) were investigated on bars of dimensions 80×10×4 mm, processing temperature 260° C. A mixture of 60 vol. % toluene and 40 vol. % isopropanol was used as the test medium. The test specimens were pre-elongated by means of a circular arc template (pre-elongation in per cent) and kept in the test medium at room temperature. The stress cracking properties were evaluated from the cracking and fracture as a function of the pre-elongation in the test medium.

TABLE

Moulding compositions and their properties

| | 1 | 2 | 3 | 4 Comparison |
|---|---|---|---|---|
| Components (parts by wt.) | | | | |
| A | 66.7 | 66.7 | 66.7 | 66.7 |
| B.1 | 7.3 | — | — | — |
| B.2 | — | 7.3 | — | — |
| B.3 | — | — | 7.3 | — |
| B.4 | — | — | — | 7.3 |
| C | 9.4 | 9.4 | 9.4 | 9.4 |
| D | 12.0 | 12.0 | 12.0 | 12.0 |
| E | 4.2 | 4.2 | 4.2 | 4.2 |
| Mould release agent | 0.4 | 0.4 | 0.4 | 0.4 |
| Properties | | | | |
| ak (ISO 180/1 A) (kJ/m$^2$) | 61 | 61 | 64 | 51 |
| Vicat B120 (ISO 306) (° C.) | 107 | 107 | 108 | 103 |
| ESC properties fracture at el. = 2.4% (min:sec) | 7:30 | 5:50 | 9:10 | 4:20 |
| UL 94V 1.6 mm | V-0 | V-0 | V-0 | V-0 |

The moulding compositions according to the invention are distinguished by a favourable combination of properties of flameproofing and mechanical properties. Surprisingly, the notched impact strength and ESC properties, which can be regarded as a measure of the resistance to chemicals, are improved decisively by the altered rubber bases compared with the prior art (diene rubber). In the resistance to stress cracking, the moulding compositions according to the invention withstand fracture for considerably longer, which can be decisive for critical uses (components of complicated geometries).

What is claimed is:

1. A thermoplastic molding composition comprising
A) at least one resin selected from the group consisting of polycarbonate and polyester-carbonate,
B) at least one rubber-elastic graft polymer having a graft base selected from the group consisting of silicone rubber, EP(D)M rubber and acrylate rubber,
C) at least one thermoplastic polymer selected from the group consisting of vinyl (co)polymer and polyalkylene terephthalate and
D) at least one phosphazene selected from the group consisting of phosphazenes of the formulae

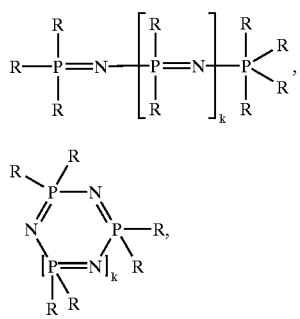

wherein
R is in each case identical or different and represents an amino group, $C_1$- to $C_8$-alkyl, $C_1$- to $C_8$-alkoxy, $C_5$–$C_6$-cycloalkyl, $C_6$–$C_{20}$-aryl, $C_6$–$C_{20}$-aryloxy or $C_7$–$C_2$-aralkyl, in each case optionally substituted by alkyl and/or halogen, and
k represents 0 or a number from 1 to 15.

2. Moulding compositions according to claim 1, comprising
40–99 parts by wt. component A,
0.5–60 parts by wt. component B,
0–45 parts by wt. component C,
0.1–50 parts by wt. component D and
0.05–5 parts by wt. fluorinated polyolefin.

3. Moulding compositions according to claim 1, comprising at least one additive chosen from the group consisting of lubricants and mould release agents, nucleating agents, antistatics, stabilisers, dyestuffs and pigments.

4. Moulding compositions according to claim 1, comprising a flameproofing agent which differs from component D.

5. Process for the preparation of moulding compositions according to claim 1, wherein components A to E and optionally additives are mixed and the mixture is subjected to melt compounding.

6. The molding composition of claim 1 wherein B) is a graft polymers of
B.1 5 to 95 wt. % of at least one vinyl monomer on
B.2 95 to 5 wt. % of one or more graft bases having a glass transition temperature of <10° C.

7. Molding compositions according to claim 6, wherein B.1 is derived from
B.1.1 50 to 99 parts by wt. of a vinylaromatic monomer and/or methacrylic acid ($C_1$–$C_8$)-alkyl esters and
B.1.2 1 to 50 parts by wt. of at least one member selected from the group consisting of vinyl cyanide, (meth) acrylic acid ($C_1$–$C_8$)-alkyl ester and derivatives of unsaturated carboxylic acid."

8. The molding composition according to claim 7, wherein
B.1.1 is a member selected from the group consisting of styrene, α-methylstyrene and methyl methacrylate and
B.1.2 is a member selected from the group consisting of acrylonitrile, maleic anhydride and methyl methacrylate.

9. The molding composition according to claim 1, wherein component C.1 is a vinyl (co)polymer of at least one monomer from the group consisting of vinylaromatic, vinyl cyanide, (meth)acrylic acid ($C_1$–$C_8$)-alkyl ester, unsaturated carboxylic acid and derivative of unsaturated carboxylic acid.

10. A method of using the composition of claim 1 comprising producing a shaped article.

11. A shaped article prepared by the method of claim 10.

* * * * *

UNITED STATES PATENT AND TRADEMARK OFFICE
CERTIFICATE OF CORRECTION

PATENT NO. : 6,433,082 B1  Page 1 of 1
DATED : August 13, 2002
INVENTOR(S) : Thomas Eckel et al.

It is certified that error appears in the above-identified patent and that said Letters Patent is hereby corrected as shown below:

Title page, Item [54] and Column 1, line 1,
Delete the title and insert the following:
-- FLAME-RESISTANT MOLDING COMPOSITIONS COMPRISING POLYCARBONATE AND GRAFT POLYMERS --

Signed and Sealed this

Twenty-eighth Day of October, 2003

JAMES E. ROGAN
*Director of the United States Patent and Trademark Office*